(No Model.) 2 Sheets—Sheet 2.
W. G. & E. A. CROSSLEY.
VEHICLE WHEEL.
No. 604,372. Patented May 24, 1898.
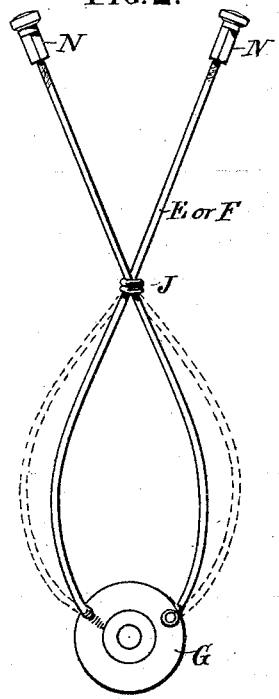
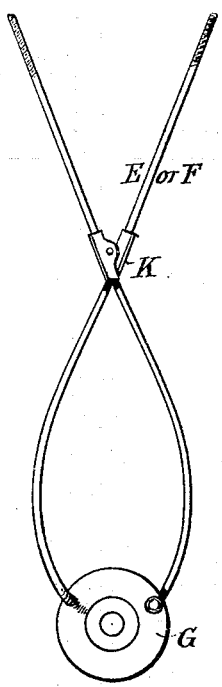
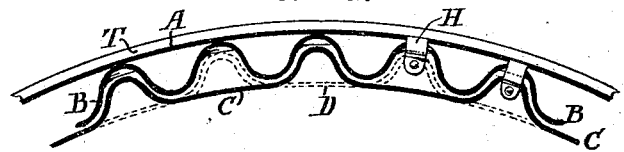
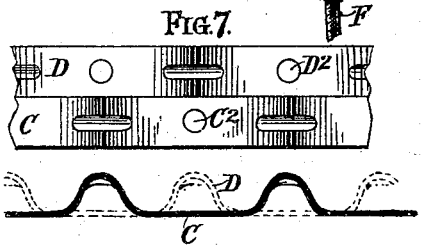
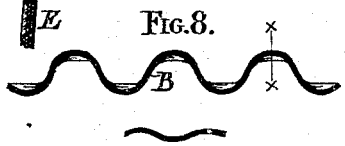
Witnesses
Inventors.
William George Crossley
Eliza Anne Crossley
by
Attys

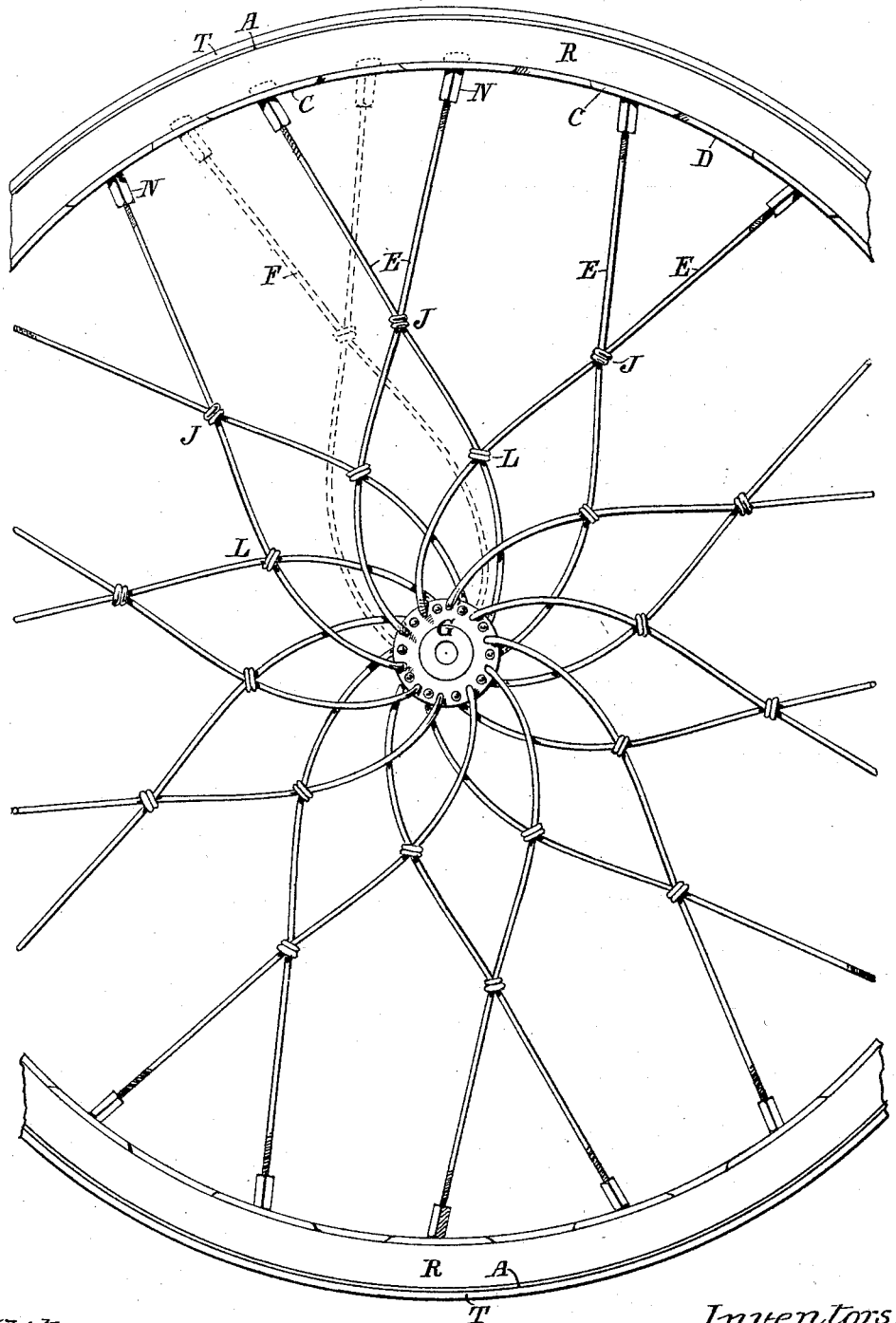

United States Patent Office.

WILLIAM GEORGE CROSSLEY AND ELIZA ANNE CROSSLEY, OF AUCKLAND, NEW ZEALAND.

VEHICLE-WHEEL.

SPECIFICATION forming part of Letters Patent No. 604,372, dated May 24, 1898.

Application filed December 30, 1896. Serial No. 617,503. (No model.) Patented in England September 3, 1896, No. 19,460.

*To all whom it may concern:*

Be it known that we, WILLIAM GEORGE CROSSLEY and ELIZA ANNE CROSSLEY, subjects of the Queen of Great Britain, and residents of Auckland, in the Colony of New Zealand, have invented certain new and useful Improvements in the Construction of Wheels for Vehicles, (for which a patent has been granted in Great Britain, dated September 3, 1896, No. 19,460;) and we do hereby declare that the following is a full, clear, and exact description thereof, reference being had to the accompanying drawings, which form a part of this specification.

Our invention is for an improved construction of wheel for cycles and other road-vehicles, light artillery, and for other purposes requiring a very light, elastic, and durable wheel having the power of absorbing the effect of shocks and blows to which such wheels are liable.

A cycle-wheel constructed according to our invention is illustrated in the annexed sheets of drawings, in which similar letters of reference indicate similar parts in any of the various figures in which they may occur.

Figure 1 represents the wheel in elevation; Fig. 2, a double or twin spoke with tension-nipples; Fig. 3, a twin spoke with central pin-joint; Fig. 4, a portion of wheel-rim, showing the component parts; Fig. 5, a section of rim through 1 2; Fig. 6, a section of rim through 3 4; Fig. 7, plan and edge views of waved rings to which the spokes are attached; Fig. 8, a side view of annular spring with section of same through $x\ x$.

In carrying out our invention in the construction of a cycle-wheel, for example, and which is illustrated in the drawings annexed, and which may be broadly described as consisting of an outer tire of leather or other suitable material T, a metal rim A, an annular convoluted spring B, two annular waved spoke-rings C and D, two series of twin spokes E and F, and the hub G.

The rim A is made of thin metal, preferably steel, and fluted or corrugated circumferentially, as shown in Figs. 5 and 6, the depression being in the center.

The spring B is made with regular convolutions or waves, as shown in Figs. 4 and 8, and is also fluted or corrugated to match the rim, either continuously or across the top and bottom of each convolution only, as seen in Fig. 8, as may be preferred.

Each spoke-ring C D, Fig. 7, is half the width of the spring B and has only half the number of waves, which are also fluted or curved, so as to correspond with and fit closely into the fluted configuration of the waves of the spring B alternately. The said rings are arranged side by side, as shown in Fig. 7, so that their waves enter those of the spring B alternately. Thus every wave of the spring receives a wave of one or the other of the spoke-rings. In each of the spaces between the waves of C and D a hole is made to receive the tension-nipples N, into which screw-threaded ends of the spokes are screwed.

The several parts described—namely, the rim A, the spring B, and spoke-rings C D—fit closely together where they are in contact and are permanently secured either by means of rivets, clips H, or equivalent devices, and if strips of metal are used for this purpose their ends may be utilized as auxiliary means to retain the leather tire; but this forms no part of the invention.

The spokes E and F are made of rods or wire and preferably steel, and in a double or twin combination of two rods or lengths of wire, as shown in Figs. 2 and 3. The outer ends from the center or junction are straight, or thereabout, and screw-threaded at the ends, and the inner ends are curved in opposite directions and terminate with the usual heads. They are hardened and tempered, so as to make them elastic to form a spring. In Fig. 2 the dotted lines indicate the curve when at rest, and the full lines show the reduced curve when under tension in the finished wheel.

The nipples N, by which tension is put upon the spokes, are round under the head to enable them to turn readily in the holes $C^2$ and $D^2$, and to enable this to be accomplished with ease we leave the body of the nipple square or the like, so as to be readily gripped.

The hub G of the wheel is provided with a circle of holes through which the spokes are threaded in the usual manner.

Where the spokes cross each other near their centers, we secure them together either by a clip J, as in Fig. 2, or by a pin-joint K, Fig. 3, or such like device, which forms a point of resistance from which the curved parts of the spokes act as a spring.

If found desirable, we may connect the spoke-wires where they cross other spoke-wires at L; but this is not essential.

The rim A is provided with a covering or tire of leather or rubber T to protect the rim A and to deaden any ringing or metallic sound. The central groove in the rim, in addition to any other means employed, will prevent any lateral displacement of the tire.

We fill in the interstices or open spaces of the spring B and adjacent parts with a composition of cork-dust and solution of rubber or gutta-percha R, which is elastic and prevents the entrance and accumulation of dirt and the like.

A wheel so constructed and with the spoke under tension is elastic to a sufficient degree, without any torsional weakness, and will absorb the effect of concussions to which such wheels are liable upon rough roads without affecting the stability of the structural parts.

It will be understood that there are two series of spokes and that they are facsimiles of each other.

Having now described our invention, what we desire to claim and secure by Letters Patent is—

1. In combination the rim, the convolute spring B, the waved spoke-rings C, D, arranged side by side with their waves alternating and filling in the waves of the spring B, and the spokes connected with the spoke-rings, substantially as described.

2. In a metallic wheel for cycles, and for other purposes, the combination with a series of twin spokes as hereinbefore described, of a rim consisting of an outer rim A, fluted or corrugated circumferentially, a fluted convoluted spring B, and two waved spoke-rings C and D, constructed, arranged, and held together as hereinbefore described, and set forth.

In testimony that we claim the foregoing as our own we have affixed hereto our signatures, in presence of two witnesses, this 10th day of November, 1896.

WILLIAM GEORGE CROSSLEY.
ELIZA ANNE CROSSLEY.

Witnesses:
ROBT. F. DRURY,
BERNARD E. DRURY.